(12) United States Patent
Yabe et al.

(10) Patent No.: US 7,360,468 B2
(45) Date of Patent: Apr. 22, 2008

(54) ELECTRIC POWER STEERING DEVICE AND RESIN GEAR USED FOR THE SAME

(75) Inventors: Toshikazu Yabe, Fujisawai (JP);
Takeshi Murakami, Fujisawa (JP);
Toshimi Takajo, Fujisawa (JP)

(73) Assignee: NSK Ltd., Tokyo (JP)

( * ) Notice: Subject to any disclaimer, the term of this patent is extended or adjusted under 35 U.S.C. 154(b) by 254 days.

(21) Appl. No.: 10/549,656

(22) PCT Filed: Mar. 18, 2004

(86) PCT No.: PCT/JP2004/003629

§ 371 (c)(1),
(2), (4) Date: Sep. 16, 2005

(87) PCT Pub. No.: WO2004/083015

PCT Pub. Date: Sep. 30, 2004

(65) Prior Publication Data
US 2006/0175123 A1 Aug. 10, 2006

(30) Foreign Application Priority Data
Mar. 19, 2003 (JP) ............................. 2003-074748
Oct. 3, 2003 (JP) ............................. 2003-345192

(51) Int. Cl.
*B62D 5/04* (2006.01)
(52) U.S. Cl. ........................... 74/446; 74/439; 180/444
(58) Field of Classification Search ................ 180/444; 74/446, 439
See application file for complete search history.

(56) References Cited
U.S. PATENT DOCUMENTS
4,777,204 A 10/1988 Ikenaga et al. ............. 524/439

6,591,708 B2 * 7/2003 Kobayashi et al. ........... 74/446
6,777,487 B2 * 8/2004 Niino et al. ................. 524/593
2004/0016590 A1 * 1/2004 Iwano ........................ 180/443

FOREIGN PATENT DOCUMENTS
EP 0 666 210 A2 8/1995

(Continued)

OTHER PUBLICATIONS

International Search Report for counterpart PCT International Application No. PCT/JP2004/003629 (WO 2004/083015 A1),dated Jun. 22, 2004, along with an English-language translation thereof.

(Continued)

*Primary Examiner*—Kevin Hurley
(74) *Attorney, Agent, or Firm*—Sidley Austin LLP

(57) ABSTRACT

An electric power steering device having a resin gear used in a speed reduction gear mechanism and the resin gear used for the device are provided. The speed reduction gear mechanism includes a driven gear that is the resin gear integrally formed by fitting a resin part having gear teeth formed on the outer peripheral surface thereof to the outside of a metal core and a drive gear meshed with the driven gear. The resin part of the resin gear is formed of a resin composition having, as a base resin, a polyamide resin containing 10 to 50% by weight of glass fiber of 5 to 9 μm in diameter, and has excellent wear resistance, durability, and dimensional stability. Grease on the meshed surfaces of the gears has such a composition that includes a thickener and 3 to 10% by weight of a wax having a melting point or softening point in the range of 70 to 130° C. in a base oil formed mainly of at least one oil selected from mineral oil, poly α-olefin oil, and alkyl polyphenyl ether.

12 Claims, 10 Drawing Sheets

FOREIGN PATENT DOCUMENTS

| | | |
|---|---|---|
| JP | 57-137762 A | 8/1982 |
| JP | 58-77964 A | 5/1983 |
| JP | 2-66364 A | 3/1990 |
| JP | 7-237266 A | 9/1995 |
| JP | 9-194867 A | 7/1997 |
| JP | 11-80540 A | 3/1999 |
| JP | 2001-71921 A | 3/2001 |
| JP | 2002-21980 A | 1/2002 |
| JP | 2002-308125 A | 10/2002 |
| JP | 2002-371290 A | 12/2002 |
| JP | 2003-3185 A | 1/2003 |
| JP | 2003-11828 A | 1/2003 |

OTHER PUBLICATIONS

European "Supplemental European Search Report", dated Apr. 25, 2007, for counterpart European Patent Application No. EP 04 72 1655.

* cited by examiner

FIG. 8

Addition amounts (wt%) of additives relative to base grease in Compositions A to C

|  | Composition A | Composition B | Composition C |
|---|---|---|---|
| Wax | 6 | 0 | 2 |
| Antioxidant | 2 | 2 | 2 |
| Antirust | 0.5 | 0.5 | 0.5 |

FIG. 9

Wear test results

| | Example 1 | Example 2 | Comparative example 1 | Comparative example 2 | Comparative example 3 | Comparative example 4 | Comparative example 5 |
|---|---|---|---|---|---|---|---|
| GF diameter in resin (μm) | 6 | 8 | 10 | 13 | 6 | 6 | 13 |
| Wax content (wt%) | 6 | 6 | 6 | 6 | 0 | 2 | 0 |
| Maximum load without wear generation (kg) | 6 | 6 | 4.5 | 4.0 | 3.0 | 3.5 | 2.5 |

FIG. 10

Durability test results

| | Example 1 | Example 2 | Example 3 | Comparative example 1 | Comparative example 2 | Comparative example 3 | Comparative example 4 | Comparative example 5 |
|---|---|---|---|---|---|---|---|---|
| Durability test result (Condition I) | 100,000 times cleared | 100,000 times cleared | 100,000 times cleared | Excessive wear amount at 80,000 times | Excessive wear amount at 70,000 times | Excessive wear amount at 40,000 times | Excessive wear amount at 50,000 times | Excessive wear amount at 20,000 times |
| Durability test result (Condition II) | Operability rejected at 90,000 times | Operability rejected at 80,000 times | 100,000 times cleared | Excessive wear amount at 80,000 times | Excessive wear amount at 70,000 times | Excessive wear amount at 40,000 times | Excessive wear amount at 50,000 times | Excessive wear amount at 20,000 times |

FIG. 11

Test results of dimensional stability and durability

| | Example 11 | Example 12 | Example 13 | Comparative example 11 | Comparative example 12 |
|---|---|---|---|---|---|
| Glass fiber diameter (μm) | 6 | 7 | 6 | 10 | 13 |
| Adhesive layer | Absent | Absent | Present | Absent | Absent |
| Dimensional stability (Condition A) | 70H ○<br>300H ○<br>500H ○ | 70H ○<br>300H ○<br>500H ○ | 70H ○<br>300H ○<br>500H ○ | 70H ○<br>300H ○<br>500H × | 70H ○<br>300H ×<br>500H × |
| Dimensional stability (Condition B) | 70H ○<br>300H ○<br>500H × | 70H ○<br>300H ○<br>500H × | 70H ○<br>300H ○<br>500H ○ | 70H ×<br>300H ×<br>500H × | 70H ×<br>300H ×<br>500H × |
| Durability (Condition C) | ○ | ○ | ○ | ○ | ○ |
| Durability (Condition D) | ○ | ○ | ○ | × | × |
| Durability (Condition E) | ○ | ○ | ○ | ○ | ○ |
| Durability (Condition F) | × | × | ○ | × | × |

Note: "H" behind a number refers to hours.

FIG. 12

Wear test results

| | | Example 11 | Example 12 | Comparative example 11 | Comparative example 12 |
|---|---|---|---|---|---|
| Glass fiber diameter (μm) | | 6 | 7 | 10 | 13 |
| Contact surface pressure Pmax | 150MPa | No wear generation | No wear generation | No wear generation | No wear generation |
| | 160MPa | No wear generation | No wear generation | No wear generation | No wear generation |
| | 170MPa | No wear generation | No wear generation | No wear generation | Slight wear generation (2 μm) |
| | 180MPa | No wear generation | No wear generation | Slight wear generation (2 μm) | Large wear generation (12 μm) |
| | 190MPa | No wear generation | No wear generation | Large wear generation (15 μm) | Test stopped |
| | 200MPa | Slight wear generation (2 μm) | Slight wear generation (2 μm) | Test stopped | Test stopped |

ELECTRIC POWER STEERING DEVICE AND RESIN GEAR USED FOR THE SAME

RELATED APPLICATIONS

This application is the National Stage of International Application No. PCT/JP2004/003629, the filing date thereof being Mar. 18, 2004 and the priority date being Mar. 19, 2003, the entire contents of which are incorporated herein by reference.

TECHNICAL FIELD

The present invention relates to an electric power steering device, and particularly to an electric power steering device having a resin gear used in a speed reduction gear mechanism constituting a power assist portion and a resin gear used for the device that is suitable for power transmission.

BACKGROUND ART

In an electric power steering device for vehicles, a speed reduction gear mechanism is installed between an electric motor and a steering shaft because the electric motor having relatively high revolutions and low torque is used. Speed reduction gear mechanisms with the use of a spur gear and other gears are known as the speed reduction gear mechanism. However, the use of a well-known worm speed reduction gear mechanism formed of a worm and a worm wheel is more typical because a larger speed reduction ratio can be obtained by a set of them, and so forth.

Such a worm speed reduction gear mechanism (hereinafter, simply referred to as reduction gear) is constructed from the worm that is a drive gear connected to a rotating shaft of an electric motor and a worm wheel meshed with the worm.

When both of the worm and the worm wheel in such a reduction gear are made of metal, there is a disadvantage that uncomfortable sounds such as rattling sound and vibration sound are generated when the steering wheel is handled. When the worm is made of metal, this problem has been conventionally solved by using a worm wheel provided with and formed integrally with a teeth portion made of a synthetic resin, in which a blank disc made of a synthetic resin material is integrally formed on the outer periphery of a metal hub, i.e. a metal core, as a worm wheel and teeth are formed on the periphery of the blank disc by cutting and other means, to suppress the generation of uncomfortable sounds such as rattling sound and vibration sound.

For the material of the resin part of the above-described resin gear, MC (monomer-cast) nylon (trademark) not containing a reinforcing material, polyamide 6, polyamide 66, and polyamide 46 that are blended with a reinforcing fiber material such as glass fiber, and the like are used in view of fatigue resistance, dimensional stability, and product cost. Generally, commercially available polyamide 6, polyamide 66, polyamide 46, and the like contain glass fiber having a diameter of ca. 10 μm or ca. 13 μm (refer to Japanese Examined Patent publication No. H06-60674 (60674/1994)).

In a worm speed reduction mechanism used in an electric power steering device, the worm is supported by two ball bearings, and a space between these two ball bearings is filled with grease for lubrication between the metal worm and the teeth of the worm wheel that is a resin gear. Generally, grease making use of mineral oil and poly-α-olefin oil in consideration of thermal resistance is used as a base oil.

Further, a damper made of rubber that allows not only a pre-load to be applied to the ball bearings arranged on both ends of the worm but also, when a small kick back is input from a tire side, information on the kickback to be transmitted only to a steering wheel by means of shifting the worm longitudinally so that a motor might not be influenced by a rotation force is sometimes attached. Usually for the rubber material, acryl rubber represented by ethylene acryl rubber having a small compression set is most generally used.

However, electric power steering devices have recently come to be used for from a light car to a car carrying a class of engine having a piston displacement of 1,000 cc to 1,500 cc, and the electric power steering devices have been high-powered. In accordance with this, PV value, the product of the contact surface pressure P at the resin gear portion and the peripheral velocity V, has become larger.

As a consequence of this, it has been found that the conventionally used grease that utilizes poly-α-olefin oil as abase oil is not effective enough for the lubrication condition between the driven gear (worm wheel) and the drive gear (worm). In addition, MC (monomer-cast) nylon (trademark) and generally commercially available polyamide resins containing glass fiber having a diameter of ca. 10 μm or ca. 13 μm have not sufficed for wear resistance at a high PV value.

As the result, there has been a problem that temporary shortage of oil film occurs due to long operation of an electric power steering device at a high PV value and wearing of tooth flank of the gear gradually progresses, thereby increasing the risk of backlash at the meshing portions between the driven gear (worm wheel) and the drive gear (worm). Thus, it is expected that steering sense worsens and unusual noises (rattling sounds) occur. Further, there has also been a fear that the whole electric power steering device becomes nonfunctional due to deformation of the gear, and in some cases, breakage of the gear.

In addition, there has been a possibility that the polyamide resins described above are highly water-absorptive in spite of being excellent in fatigue resistance and absorb water to swell the teeth portion of the gear of the worm wheel, spaces present between the worm and the worm wheel at an early stage after the production disappear, and the teeth portion presses the worm by further swelling.

When the worm wheel swells as just described, steering becomes heavier because frictional resistance between the worm and the worm wheel becomes larger, and the gear portion is worn out or broken due to an increase of pressure on the gear portion and an increase of frictional resistance, thereby giving rise to a failure of the electric power steering device.

The object of the present invention is to solve the above problems and to provide an electric power steering device, in which grease containing a wax to prevent a gear portion from being worn out and broken as well as to exert an efficient lubricating effect during a high temperature operation is used between a driven gear (worm wheel) and a drive gear (worm) and a resin gear suitable for power transmission of which dimensional change due to water absorption is suppressed by making up a resin part with a polyamide resin containing glass fiber finer than one conventionally used as a reinforcing fiber material and thus being free from fear of wear or breakage of the gear portion is used in the speed reduction gear mechanism constituting a power assist portion, and a resin gear used for the electric power steering device.

DISCLOSURE OF THE INVENTION

An electric power steering device according to the present invention uses a speed reduction gear mechanism including a driven gear that is a resin gear and a drive gear that meshes with the driven gear. In the resin gear, a resin part formed with gear teeth on the outer peripheral surface thereof is integrally formed on the periphery of a metal hub, and the resin part is formed of a resin composition having a polyamide resin, as a base resin, containing 10 to 50% by weight of glass fiber having a diameter of 5 to 9 μm.

Further, an adhesive layer composed of a silane coupling agent having either an epoxy group or an amino group at one end may be provided between the metal hub and the resin part. The glass fiber having a diameter of from 6 to 8 μm may be used, and the glass fiber having a length in the range of from 100 to 900 μm is used.

Still further, the resin part may be formed of a resin composition having the polyamide resin, as a base resin, in which part of the glass fibers is substituted by carbon fibers.

Still further, grease applied to the meshed surfaces of the gears may have such a composition that includes a thickener and 3 to 10% by weight of a wax having a melting point or softening point in the range of 70 to 130° C. in a base oil formed mainly of at least one oil selected from mineral oil, poly-α-olefin oil, and alkyl polyphenyl ether.

The resin gear can be applied to any of worm wheel, helical gear, spur gear, bevel gear, and hypoid gear.

BRIEF DESCRIPTION OF DRAWINGS

FIG. 8 is a representation explaining the kinds of additives added to grease and addition amounts thereof;

FIG. 9 is a representation explaining results of wear tests in a first test;

FIG. 10 is a representation explaining results of durability tests in the first test;

FIG. 11 is a representation explaining test results of dimensional stability and durability in a second test; and FIG. 12 is a representation explaining results of wear tests in the second test.

BEST MODE FOR CARRYING OUT THE INVENTION

Hereinafter, embodiments of the present invention are explained.

[Structure of Electric Power Steering Device]

Figure 1:
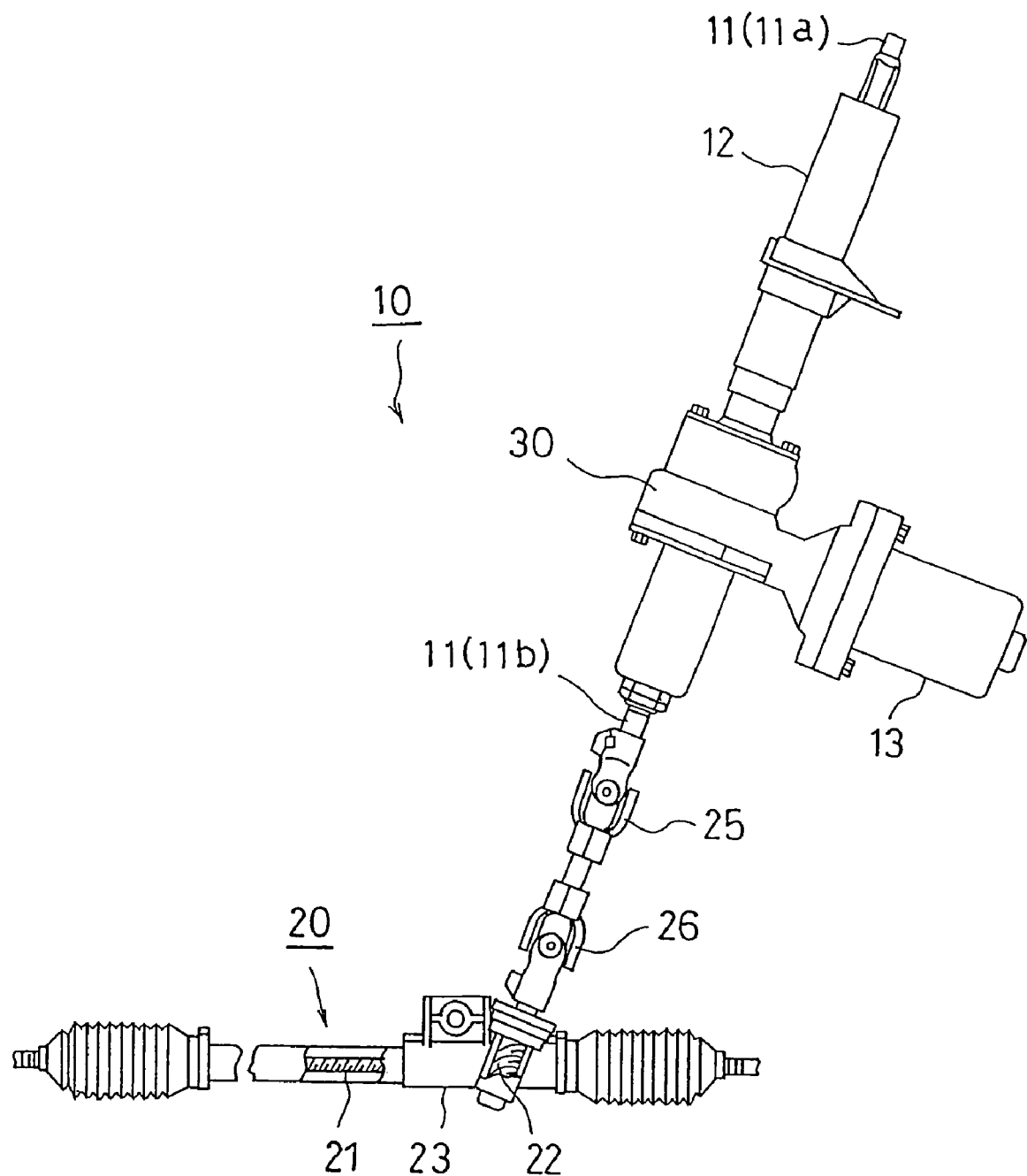
FIG. 1 is a front view explaining a structure of an electric power steering device of the present invention.

FIG. 1 is a front view explaining the structure of a column type electric power steering device 10 according to the present invention in which a resin gear suitable for power transmission according to the present invention is used in a speed reduction mechanism. In FIG. 1, the numeral 11 represents a steering wheel shaft, 12 represents a steering wheel shaft housing, 13 represents an electric motor, and 20 represents a rack-and-pinion motion conversion mechanism.

Although not shown in FIG. 1, the steering wheel shaft 11 is composed of an upper steering wheel shaft 11a and a lower steering wheel shaft 11b. The steering wheel shaft 11 is supported rotatably around the shaft center in the inside of the steering wheel shaft housing 12, and the steering wheel shaft housing 12 is fixed at a predetermined location within a vehicle compartment in a tilted state with the lower portion toward the front. A steering wheel not illustrated is fixed to the upper end of the upper steering wheel shaft 11a.

Further, the upper steering wheel shaft 11a and the lower steering wheel shaft 11b are coupled by a torsion bar not illustrated, steering torque transmitted from the steering wheel via the upper steering wheel shaft 11a to the lower steering wheel shaft 11b is detected by the torsion bar, and an output of the electric motor 13 is controlled based on the detected steering torque.

The rack-and-pinion motion conversion mechanism 20 is placed approximately horizontally in an engine room at the front of the vehicle such that its longitudinal direction is oriented to the right and left direction of the vehicle and is composed of a rack shaft 21 movable in the shaft direction, a pinion shaft 22 including a pinion provided with a teeth portion that is supported obliquely to the shaft center of the rack shaft 21 and meshes with a teeth portion of the rack shaft 21, and a tubular rack shaft case 23 that supports the rack shaft 21 and the pinion shaft 22.

The pinion shaft 22 and the lower portion of the lower steering wheel shaft 11b are connected via universal couplings 25 and 26. The middle portion of the lower steering wheel shaft 11b is arranged with a worm speed reduction gear mechanism 30 described later and structured such that an auxiliary steering power is supplied from the electric motor 13 to the lower steering wheel shaft 11b.

Figure 2:
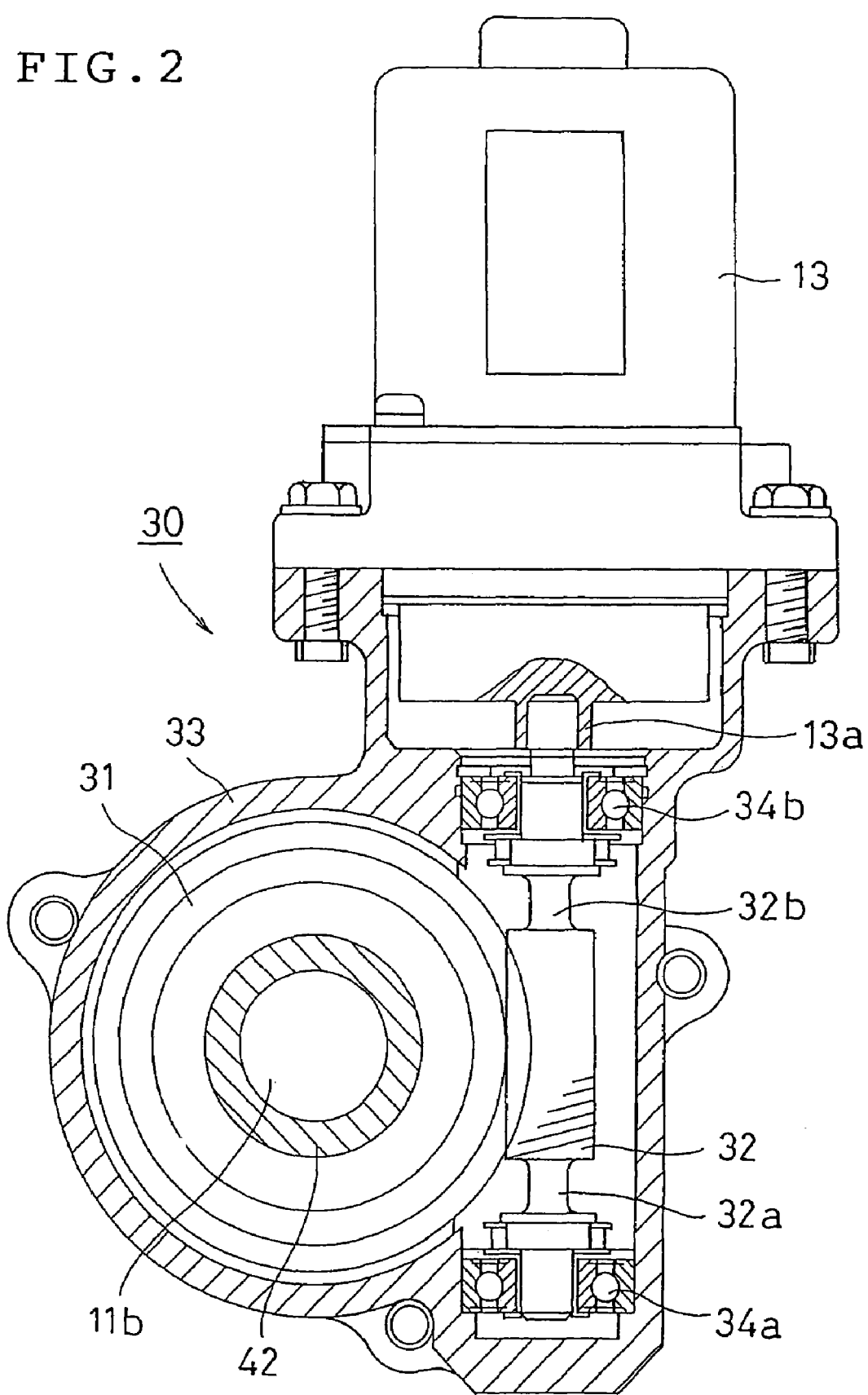
FIG. 2 is a partial cross sectional view explaining a structure of a worm speed reduction gear mechanism of the electric power steering device shown in FIG. 1.

FIG. 2 is a partial cross sectional view showing the structure of the worm speed reduction gear mechanism 30 of the electric power steering device 10 described above, where the numeral 31 represents a worm wheel, 32 represents a worm that meshes with the worm wheel 31, and 33 is a gear case; The worm 32 is integrally formed with worm shafts 32a and 32b at its both ends, and the worm shafts 32a and 32b are rotatably supported by ball bearings 34a and 34b mounted respectively on the gear case 33. Further, the worm shaft 32b is coupled to a driving shaft 13a of the electric motor 13 by spline or serration coupling.

The hub of the worm wheel 31, that is, a metal core 42 is coupled to the lower steering wheel shaft 11b, and the rotation of the electric motor 13 is transmitted to the lower steering wheel shaft 11b via the worm 32 and the worm wheel 31.

Figure 3:
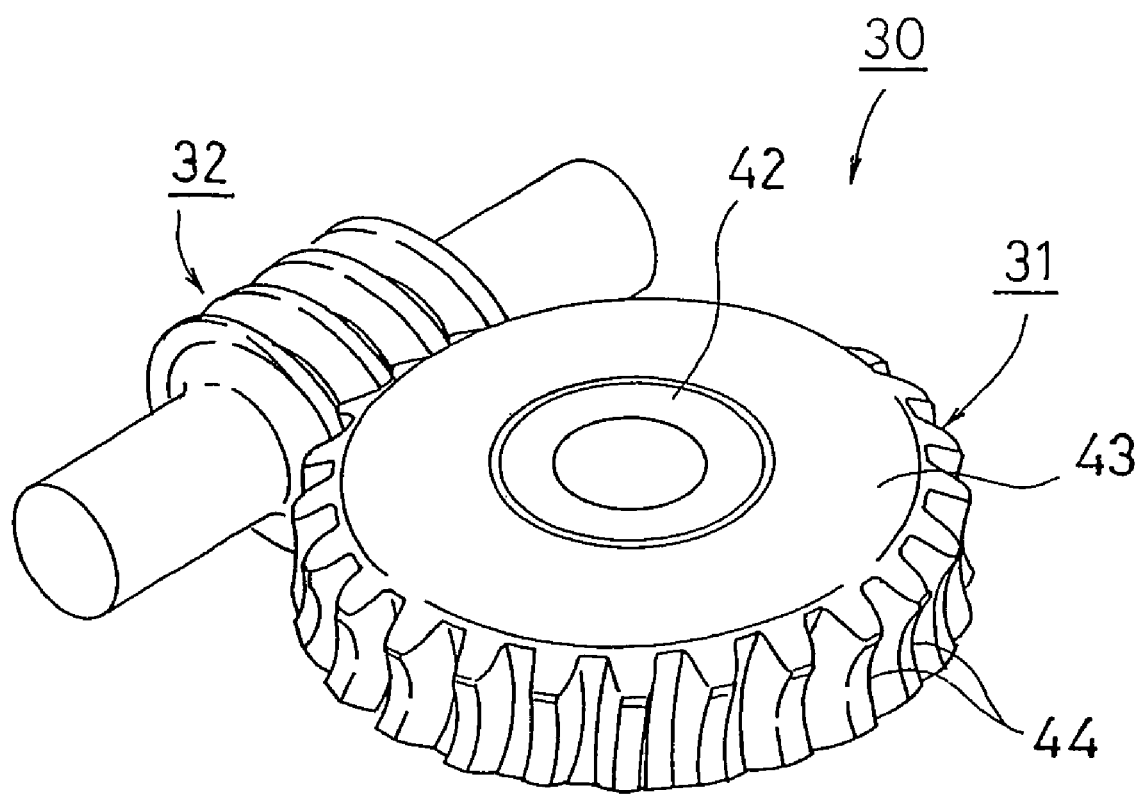
FIG. 3 is a perspective view showing a structure of a worm and a worm wheel of the worm speed reduction gear mechanism.

FIG. 3 is a perspective view showing the structure of the worm wheel 31 and the worm 32 of the worm speed reduction gear mechanism 30 of the embodiment of the present invention. The worm wheel 31 is composed of a metal hub, that is, a metal core 42 worked appropriately by cross knurling and the like on the outer peripheral surface thereof and a resin part 43, fitted to the worked surface, that is formed of a resin composition having a polyamide resin, as a base resin, containing 10 to 50% by weight of glass fiber having a diameter of from 5 to 9 μm and formed with gear teeth 44 on the peripheral end surface thereof, where these are formed integrally with each other.

On the other hand, the worm 32 is made of metal, as is the case with conventional worms. The surface hardness of this worm 32 may be enhanced by subjecting to thermal treatment, nitriding, and the like as needed, thereby improving wear resistance to glass fiber contained in the worm wheel 31. Further, when sliding sounds generated by its sliding on the worm wheel 31 are considered, reduction in the sliding sounds can be achieved by adjusting surface roughness Ra to a range of from 0.02 to 0.2 µm, more preferably from 0.02 to 0.06 µm. The surface roughness Ra lower than 0.02 µm is difficult to work up and becomes costly, and thus not practical. As a method for achieving the surface roughness Ra=0.02 to 0.06 µm, a method of performing barrel finishing after polishing is practical.

[Material for Worm Wheel]

The resin part 43 of the worm wheel 31 is preferably made of polyamide 6, polyamide 66, or polyamide 46 that is excellent in fatigue resistance as a base resin. The molecular weight of the polyamide resin is in the range capable of injection molding in a state containing glass fiber, specifically from 13,000 to 28,000 in the number average molecular weight, and more preferably in the rage of 18,000 to 26,000 in the number average molecular weight when fatigue resistance and moldability are considered. When the number average molecular weight is lower than 13,000, fatigue resistance becomes deteriorated because the molecular weight is too low, and its practical utility is low. On the other hand, when the number average molecular weight exceeds 28,000, the melt viscosity becomes too high if glass fiber is contained in a practical content of 15 to 35% by weight, and the production of a resin gear by injection molding with high accuracy becomes difficult, which is not desirable.

These base resins may be combined with other polyamide resins and resins such as polyolefin resin that is denatured by an acid anhydride to improve wettability to a grease base oil consisting of a base oil of low polarity that is usually used between a worm and a worm wheel or with rubber-like materials such as ethylene-propylene-unconjugated diene (EPDM) rubber that improves shock resistance.

These base resins show durability higher than a certain level even by themselves, work effectively against wearing out of the metal worm 32 that is the counterpart material of the worm wheel 31, and function adequately as a speed reduction gear. However, it is expected that the gear teeth 44 are worn out and damaged when used under harsher conditions, and therefore it is preferred to mix a reinforcing material in order to enhance reliability.

As the reinforcing material, glass fiber having a diameter of from 5 to 9 µm, more preferably in the range of from 6 to 8 µm is used and surface-treated with a silane coupling agent having an epoxy group, an amino group, or the like on its one end in consideration of adhesiveness to the polyamide resin that is the base resin.

The silane coupling agent bound to the surface of the glass fiber acts on amide bond of the polyamide resin through the functional group such as epoxy group or amino group present on the one end and enhances the reinforcing effect of the glass fiber. At the same time, there is also an effect of suppressing dimensional change due to water absorption.

In other words, when glass fiber is contained in the polyamide resin at the same weight content, the use of thinner glass fiber having a diameter of from 5 to 9 µm than a conventional one having a diameter of 10 to 13 µm results in an increase of glass fiber pieces that act on the amide bond, thereby increasing mechanical strength such as tensile strength and fatigue resistance such as flexural fatigue strength as well as enhancing the effect of suppressing dimensional change due to water absorption.

However, when glass fiber having a diameter smaller than 5 µm is used, mechanical strength such as impact resistant strength tends to decrease as well as increases the production cost, which lowers practical utility and is undesirable.

The fiber length of the glass fiber is in the range of from 100 to 900 µm, more preferably from 300 to 600 µm. When the fiber length is shorter than 100 µm, it is too short to exert the reinforcing effect and the effect of suppressing dimensional change due to water absorption, which is not desirable. Further, when the fiber length exceeds 900 µm, fiber damage during the process of molding the resin part and deterioration in molding accuracy due to lowering of orientation are expected to occur despite the fact that the reinforcing effect and the effect of suppressing dimensional change are enhanced, and thus molding of the resin part having teeth shape on the outer peripheral portion becomes difficult, which is not desirable.

The content of glass fiber is from 10 to 50% by weight of the whole resin, more preferably from 15 to 35% by weight. When the mixing ratio of the glass fiber is lower than 10% by weight, mechanical strength and the effect of suppressing dimensional change due to water absorption are not sufficient, which is not desirable. Further, when the mixing ratio of the glass fiber exceeds 50% by weight, there is a possibility that the worm 32 tends to be easily damaged and wearing away of the worm 32 is promoted to result in lack of durability as a speed reduction gear, which is not desirable.

The glass fiber having a fiber diameter of from 5 to 9 µm explained above not only suppresses dimensional change due to water absorption but also increases practical glass fiber pieces at the same mixing amount (% by weight) compared with conventional glass fiber having a fiber diameter of from 10 to 13 µm. Therefore, it becomes possible to load more heavily by the increase of the glass fiber pieces, and the resin teeth portion becomes harder to be worn even when used under a higher surface pressure, thereby allowing adaptation to a use condition of a high surface pressure that is brought about by downsizing of a gear.

It should be noted that part of the glass fiber as the reinforcing material may be substituted by a fibrous substance such as carbon fiber, or a whisker such as potassium titanate whisker and that a coloring agent and the like may also be added.

Further, it is desirable to add an iodide heat stabilizer and an amine antioxidant either alone or in combination to prevent deterioration by heat generated during molding and usage.

In order to further suppress a dimensional change of the polyamide resin that is a base resin due to its water absorption, it is more effective to provide an adhesive layer between the outer periphery of the metal core and the inner periphery of the resin part. To form the adhesive layer, for example, there is a method in which the resin part is subjected to hot press fitting to the outer periphery of the metal core after applying a silane coupling agent thereon, followed by radiofrequency heating.

When the radiofrequency heating is carried out, not only is a strong adhesive layer formed but also the removal of residual stress generated by press fitting can be carried out at the same time because only the inner periphery (interface) of the resin part adjacent to the outer periphery of the metal core is melted. The adhesive force is enhanced when the temperature of the metal core portion is kept at from 200 to 450° C. at the time of the radiofrequency heating. Although heating may be carried out in an air atmosphere, oxidative deterioration of the resin and the like is suppressed by carrying out in an inert gas atmosphere such as argon gas, which is desirable.

The silane coupling agent used for adhesion has an alkoxyl group that is a hydrolyzable group on one end of its chemical structure, and this alkoxy group is hydrolyzed to yield a hydroxyl group. This hydroxyl group is condensed with a hydroxyl group on the metal surface by dehydration to form a covalent bond having a high bonding strength with the metal. The other end of the silane coupling agent has an organic functional group, and this organic functional group forms a bond with amide bond in the molecular structure of the polyamide resin, thereby giving rise to strong binding between the metal core 42 and the resin part 43.

As the organic functional group, amino group and epoxy group are preferred. The silane coupling agent having such an organic functional group includes
γ-glycidoxypropyltrimethoxysilane,
β-(3,4-epoxycyclohexyl)ethyltrimethoxysilane,
γ-aminopropyltriethoxysilane,
N-β-(aminoethyl)-γ-aminopropyltriethoxysilane,
γ-ureidopropyltriethoxysilane, and the like. Particularly, the silane coupling agent having an epoxy group as the organic functional group is high in reactivity with amide bond and more desirable.

In order to allow the adhesive layer to be bound harder to the outer periphery of the metal core, it is better to increase surface hydroxyl groups on the outer periphery of the metal core 42, and for this purpose, surface processing by oxygen plasma and the like is further desired.

With the aim of improving adherence between the metal core 42 and the resin part 43 and preventing the latter portion on the boundary with the metal core 42 from slipping away, inclusive of an increase of the adhesive force, shot blasting, knurling, and the like may be applied beforehand on the outer periphery of the metal core 42, and particularly, knurling is desired. The depth of V-shaped groove in knurling is from 0.2 to 0.8 mm, and particularly preferably from 0.3 to 0.7 mm.

[Grease]

Next, grease to keep excellent the lubrication between the teeth portion of the resin-made worm wheel and the teeth portion of the metal worm is explained.

The grease used in the present invention is composed of a thickener and a base oil as the main components and further a wax that is added to keep excellent the lubrication between the resin-made worm wheel and the worm under high surface pressure and has a melting point or softening point in the range of 70 to 130° C. The base oil is at least one selected from mineral oil, poly α-olefin oil, and alkyl polyphenyl ether. The thickener includes a urea compound made from amine and isocyanate, lithium soap, lithium complex soap, barium soap, barium complex soap, and the like. Among these thickeners, a urea compound having urea bond that is analogous to polyamide in structure is particularly desirable because of excellent adsorption on the polyamide resin.

The wax having a melting point or softening point in the range of 70 to 130° C. is solid at ordinary temperatures and dispersed in a state of fine particles. When the temperature rises due to sliding contact of the resin worm wheel and the worm, the particles change to highly viscous liquid at their meshing portion. This highly viscous liquid raises the viscosity of a liquid itself (compatible liquid of base oil and wax) due to its compatibility with a base oil that is lowered in viscosity by the temperature rise, thereby preventing the liquid from escaping from the meshing portion as a whole. Even in a state that part of the wax remains without turning into the compatible liquid, the mixture stays at the meshing portion and keeps lubrication excellent even under a high surface pressure.

As specific examples of these waxes, ester waxes such as montanoic acid ester wax and partially saponified montanoic acid ester wax, hydrocarbon waxes such as polyethylene wax, fatty acid amides such as stearoamide, lauryl amide, and behenic acid amide, and the like can be used. Among these waxes, hydrocarbon waxes having high compatibility with the base oil described above are most preferred. The addition amount of these waxes is from 3 to 10% by weight, and more preferably from 4 to 8% by weight in a grease composition. When the addition amount is less than 3% by weight, the rise in viscosity due to the compatibility of the liquid itself at the time of operation is not enough, and improvement in lubrication is not sufficiently achieved, which is not desirable. When the addition amount exceeds 10% by weight, the consistency of grease is lowered, and the rise in viscosity at the time of turning into a compatible liquid becomes too high, thereby elevating a torque at the time of gear operation and resulting in poor operability, which is not desirable.

To improve wettability to the polyamide resin, diester oil, polyol ester oil, aromatic ester oil, and the like may be added to the base oil. Specifically, the diester oil includes dioctyl adipate (DOA), diisobutyl adipate (DIBA), dibutyl adipate (DBA), dioctyl azelate (DOZ), dibutyl sebacate (DBS) dioctyl sebacate (DOS), and the like.

The polyol ester oil includes pentaerythritol ester oil, dipentaerythritol ester oil, tripentaerythritol ester oil, neopentyl-type diol ester oil, and trimethylolpropane ester oil that are derivatized with C4 to C18 alkyl chain, and the like.

The aromatic ester oil includes trioctyl trimellitate (TOTM), tridecyl trimellitate, tetraoctyl pyromellitate, and the like.

These ester base oils are added to grease either alone or in combination in the range of from 1 to 20% by weight, more preferably from 2 to 10% by weight relative to the total weight of the grease composition. When the addition amount is less than 1% by weight, an effect of improving wettability can not be obtained to a sufficient degree. On the other hand, even when an amount exceeding 20% by weight is added, not only is a significant effect of improving wettability not obtained but also it is expected to have an adverse effect such as swelling on other parts such as rubber damper to allow moving of the worm in the shaft direction.

Furthermore, an oxidation stabilizer and other additives to improve antirust property and the like can be added to this grease. For example, an amine or phenol antioxidant, a rust inhibitor such as calcium sulfonate, an extreme-pressure additive such as MoDTC, and the like can be listed.

Figure 4:
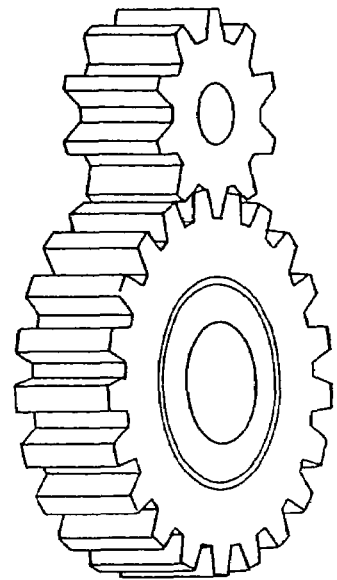
FIG. 4 is a perspective view showing an appearance of a spur gear.
Figure 5:
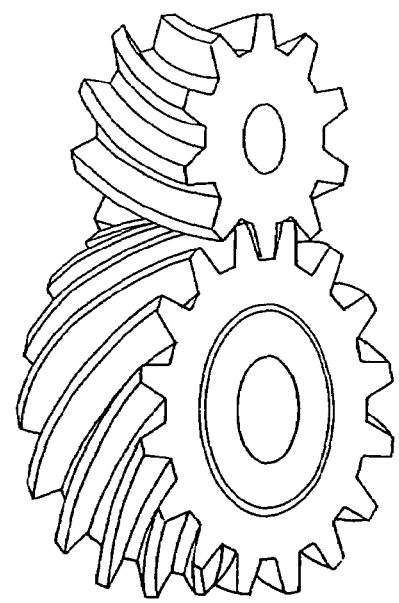
FIG. 5 is a perspective view showing an appearance of a helical gear.
Figure 6:
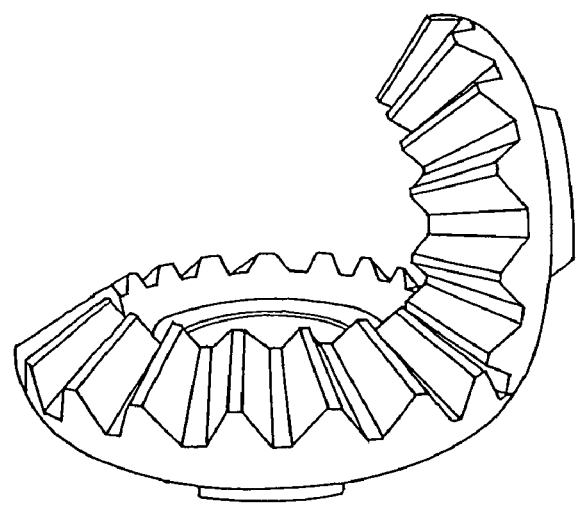
FIG. 6 is a perspective view showing an appearance of a bevel gear.
Figure 7:
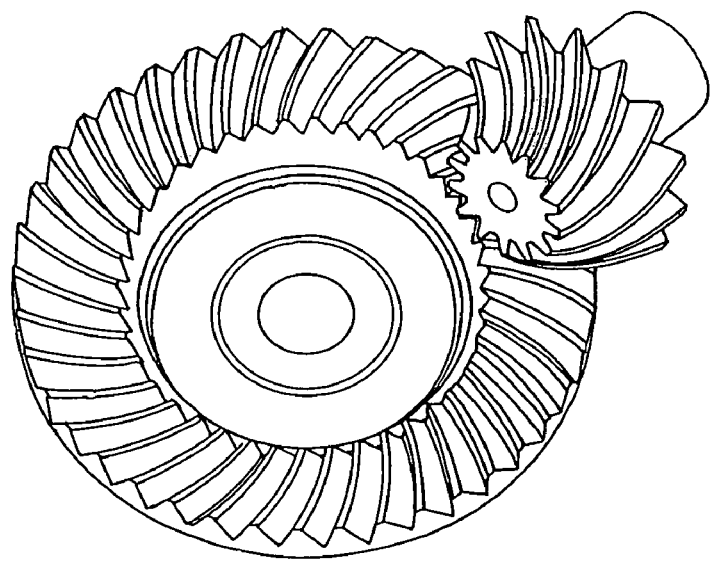
FIG. 7 is a perspective view showing an appearance of a hypoid gear.

As described, in the embodiment of the present invention, the worm speed reduction gear mechanism has been exemplified as a speed reduction gear mechanism of an electric power steering device. As a gear to be used therein, an example of the worm wheel that is a resin gear has been exemplified, and the material of the resin gear, the grease to be used, and the like have been explained. However, the resin gear is not limited to the worm wheel, and various modifications are possible. For example, the spur gear shown in FIG. 4, the helical gear shown in FIG. 5, the bevel gear shown in FIG. 6, the hypoid gear shown in FIG. 7, and the like are possible as a gear shape.

[Tests for Dimensional Stability, Durability, and Wear Resistance of Worm Wheel and their Evaluation Results]

Next, tests for dimensional stability, durability, and wear resistance of worm wheel and their evaluation results are explained.

A. A First Test and its Evaluation Results

In a first test, tests for durability and wear resistance were carried out with respect to a plurality of examples of worm wheels and comparative examples and evaluated. It should be noted that the present invention is not limited at all by the examples and the comparative examples explained below.

a. Resin Gear Part (1) Structure 1

Metal core: Steel (material JIS-S45C) having an outer diameter of 65 mm and a width of 16 mm with knurled grooves of a depth of 0.5 mm.

Resin: Polyamide 6 (containing 30% by weight of glass fiber (GF) having a diameter of 6 μm, UBE nylon (trademark) produced by Ube Industries, Ltd., a copper iodide heat stabilizer contained). The glass fiber having a diameter of 6 μm means glass fiber having an average diameter of approximately 6 μm and contains glass fibers having diameters in the range of from 5 to 7 μm.

Molding of resin part: Insert molding using the metal core as a core.

Peripheral shape of resin part at the time of molding: Inner diameter of 64 mm, outer diameter of 83 mm, and width of 15.5 mm having a helical shape with a cutting allowance left.

After molding, teeth of the resin part were further cut to finish finally in a worm wheel shape.

(2) Structure 2

Glass fiber having a diameter of 8 μm was used as the glass fiber (GF) mixed with the resin, but otherwise the structure was the same as in the structure 1. Here, the glass fiber having a diameter of 8 μm means glass fiber having an average diameter of approximately 8 μm and contains glass fibers having diameters in the range of from 7 to 9 μm.

(3) Structure 3

Metal core: Steel (material JIS-S45C) having an outer diameter of 65 mm and a width of 16 mm with knurled grooves of a depth of 0.5 mm. After degreasing, soaking in a methanol solution of 10% by weight of γ-glycidoxypropyltrimethoxysilane ("A-187" produced by Nihonunica Corporation) that is a silane coupling agent having an epoxy group, and then drying in the air with the aim of forming an adhesive layer, a coating of the silane coupling agent was formed on the surface of the metal core.

Resin: Polyamide 6 (containing 30% by weight of glass fiber (GF) having a diameter of 6 μm, UBE nylon (trademark) produced by Ube Industries, Ltd., a copper iodide heat stabilizer contained).

Molding of resin part: Molding as a body separated from the metal core.

Peripheral shape of resin part at the time of molding: Inner diameter of 64 mm, outer diameter of 83 mm, and width of 15.5 mm having a helical shape with a cutting allowance left.

High frequency fusion: The resin part treated against water absorption was heated for 20 min at 140° C. to swell the resin part, and then press-fitted to the metal core. Subsequently, the resin part was fused (adhered) to the metal core by high frequency heating under an argon atmosphere until the temperature of the metal core rose to 350° C., followed by rapid cooling by dipping in water. Then, teeth of the resin part were cut to finish finally in a worm wheel shape.

(4) Structure 4 (Comparative Example 1)

Although the structure was almost the same as in the structure 1, glass fiber having a diameter of 10 μm was used as the glass fiber (GF) mixed with the resin. Here, the glass fiber having a diameter of 10 μm means glass fiber having an average diameter of approximately 10 μm and contains glass fibers having diameters in the range of from 9 to 11 μm.

(5) Structure 5 (Comparative Example 2)

Although the structure was almost the same as in the structure 1, glass fiber having a diameter of 13 μm was used as the glass fiber (GF) mixed with the resin. Here, the glass fiber having a diameter of 13 μm means glass fiber having an average diameter of approximately 13 μm and contains glass fibers having diameters in the range of from 12 to 14 μm.

b. Preparation of Grease

FIG. 8 is a representation explaining the kinds of additives added to grease and their addition amounts. A base grease in which poly-α-olefin oil (8 mm$^2$/s at 100° C.) was used as the base oil for grease and an aliphatic diurea compound was used as a thickener (content of thickener: 13% by weight) was added with various additives (wax, antioxidant, antirust) shown in FIG. 8 to prepare three kinds of grease consisting of composition A, composition B, and composition C having consistency No. 2.

Wax: Polyethylene wax (Mitsui Hiwax 320P (Molecular weight 3,000, softening point 114° C.) produced by Mitsui Chemicals, Inc.)

Antioxidant: 4,4'-Dioctyldiphenylamine (Nonflex OD-RH produced by Seiko Chemical Co., Ltd.)

Antirust: Neutral calcium sulfonate (Molesco-Amber SC45N (mineral oil content 54%) produced by Matsumura Oil Research Corp.)

c. Combination of Resin Gear and Grease in Test Apparatus

The above-described structures 1 to 5 for resin gear and the above-described grease, Composition A, Composition B, and Composition C, were set in an apparatus by the following combinations.

EXAMPLE 1

Resin gear: Structure 1 Grease: Composition A

EXAMPLE 2

Resin gear: Structure 2 Grease: Composition A

EXAMPLE 3

Resin gear: Structure 3 Grease: Composition A

COMPARATIVE EXAMPLE 1

Resin gear: Structure 4 Grease: Composition A

COMPARATIVE EXAMPLE 2

Resin gear: Structure 5 Grease: Composition A

COMPARATIVE EXAMPLE 3

Resin gear: Structure 1 Grease: Composition B

COMPARATIVE EXAMPLE 4

Resin gear: Structure 1 Grease: Composition C

COMPARATIVE EXAMPLE 5

Resin gear: Structure 5 Grease: Composition B d. Test Method and Evaluation Results of Wear Resistance In order to simulate lubrication between the worm (made of metal) and the worm wheel (resin gear) of an actual electric power steering device, plate test pieces were prepared by using the same materials as the resin materials used in the examples 1 and 2 and the comparative examples 1 to 5, and these test pieces were allowed to come in contact with revolving steel balls (peripheral speed of 1 m/sec at the contact portion of the ball top) of a ball-on-disk test apparatus in which three steel balls (SUJ2) having a diameter of 6.35 mm are arranged 120 degrees apart, and wear resistance was evaluated. At an atmospheric temperature set to 80° C. and in a state that grease (Composition A, Composition B, or Composition C) was present between the test piece and the balls, rotation was continued for 8 hours under each load increased beginning from 2 kg and in increments of 0.5 kg, and then signs of wear of the test piece were observed. The results of the wear test are shown in FIG. 9.

As is apparent from FIG. 9, when a resin gear mixed with glass fiber thinner than conventional glass fiber as the reinforcing material and grease containing a prescribed amount of wax were combined, wear occurrence was not observed even after using under a high load and practically high surface pressure, and wear resistance was found to be improved.

e. Test Method and Evaluation Results of Durability

In the test of durability, the gears having the combinations shown in the above examples 1 to 3 and the comparative examples 1 to 5 were installed on an actual electric power steering device, respectively; grease was filled (grease was evenly applied to the outer peripheral surface of the resin part of the worm wheel and the surface of the worm); in an environmental condition 1, the atmospheric temperature and the relative humidity were set to 80° C. and 30%, respectively; in an environmental condition 2, the atmospheric temperature and the relative humidity were set to 80° C. and 70%, respectively; steering was performed 100,000 times; and the amount of wear of the worm wheel not larger than 40 μm from the initial value was considered to be acceptable. The amount of wear was measured every 10,000 times of steering. Further, a case in which the space between the resin gear and the worm was decreased due to a dimensional change caused by water absorption and the operability (operation torque) was worsened more than 20% was considered to be unacceptable. The results of the durability test are shown in FIG. 10.

In the environmental condition 1, the tendency of the maximum load at which wear did not occur as shown in FIG. 9 and the tendency of the durable number at which the amount of wear exceeded the criterion were in approximate agreement. In the environmental condition 2 where an influence by the dimensional change due to water absorption became larger, only the example 3 in which adhesion by high frequency fusion was combined could endure 100,000 times of steering and was judged to be acceptable. In the examples 1 and 2, the amount of wear did not exceed the criterion, but the operability deteriorated due to dimensional change caused by water absorption, thereby having been judged to be unacceptable.

B. A Second Test and its Evaluation Results

In a second test, tests for dimensional stability, durability, and wear resistance were carried out with respect to a plurality of examples and comparative examples of worm wheels shown below and evaluated. It should be noted that the present invention is not limited at all by the following examples and the comparative examples.

a. Structures of Examples and Comparative Examples

EXAMPLE 11

Metal core: Steel (material JIS-S45C) having an outer diameter of 65 mm and a width of 16 mm with knurled grooves of a depth of 0.5 mm.

Resin: Polyamide 6 containing 30% by weight of glass fiber (GF) having a diameter of 6 μm (UBE nylon (trademark) produced by Ube Industries, Ltd., a copper iodide heat stabilizer contained).

The glass fiber having a diameter of 6 μm means glass fiber having an average diameter of approximately 6 μm and contains glass fibers having diameters in the range of from 5 to 7 μm.

Molding of resin part: Insert molding using the metal core as a core.

Peripheral shape of resin part at the time of molding: Inner diameter of 64 mm, outer diameter of 83 mm, and width of 15.5 mm having a helical shape with a cutting allowance left.

After molding, teeth of the resin part were further cut to finish finally in a worm wheel shape.

EXAMPLE 12

Glass fiber having a diameter of 7 μm was used as the glass fiber (GF) mixed with the resin, but otherwise the same as in the example 11. Here, the glass fiber having a diameter of 7 μm means glass fiber having an average diameter of approximately 7 μm and contains glass fibers having diameters in the range of from 6 to 8 μm.

EXAMPLE 13

Metal core: Steel (material JIS-S45C) having an outer diameter of 65 mm and a width of 16 mm with knurled grooves of a depth of 0.5 mm. After degreasing, soaking in a methanol solution of 10% by weight of γ-glycidoxypropyltrimethoxysilane ("A-187" produced by Nihonunica Corporation) that is a silane coupling agent having an epoxy group, and then drying in the air with the aim of forming an adhesive layer, a coating of the silane coupling agent was formed on the surface of the metal core.

Resin: Polyamide 6 containing 30% by weight of glass fiber (GF) having a diameter of 6 μm (UBE nylon (trademark) produced by Ube Industries, Ltd., a copper iodide heat stabilizer contained).

The glass fiber having a diameter of 6 μm means glass fiber having an average diameter of approximately 6 μm and contains glass fibers having diameters in the range of from 5 to 7 μm.

Molding of resin part: Molding as a body separated from the metal core.

Peripheral shape of resin part at the time of molding: Inner diameter of 64 mm, outer diameter of 83 mm, and width of 15.5 mm having a helical shape with a cutting allowance left.

High frequency fusion: The resin part treated against water absorption was heated for 20 min at 140° C. to swell the resin part, and then press-fitted to the metal core. Subsequently, the resin part was fused (adhered) to the metal core by high frequency heating in an argon atmosphere until the temperature of the metal core rose to 350° C., followed by rapid cooling by dipping in water. Then, teeth were formed by cutting the resin part to finish finally in a worm wheel shape.

COMPARATIVE EXAMPLE 11

Although almost the same as in the example 11, glass fiber having a diameter of 10 μm was used as the glass fiber (GF) mixed with the resin. Here, the glass fiber having a diameter of 10 μm means glass fiber having an average diameter of approximately 10 μm and contains glass fibers having diameters in the range of from 9 to 11 μm.

COMPARATIVE EXAMPLE 12

Although almost the same as in the example 11, glass fiber having a diameter of 13 μm was used as the glass fiber (GF) mixed with the resin. Here, the glass fiber having a diameter of 13 μm means glass fiber having an average diameter of approximately 13 μm and contains glass fibers having diameters in the range of from 12 to 14 μm.

b. Tests for Dimensional Stability, Durability, and Wear Resistance, and their Evaluation Results FIG. 11 represents the test results of dimensional stability and durability, and FIG. 12 represents the test result of wear resistance. First, their test methods are explained.

b-1. Test for Dimensional Stability

In the test for dimensional stability, a dimensional change of the outer diameter of a gear was measured for each of the above examples 11 to 13 and the comparative examples 11 and 12 after left standing for 70, 300, and 500 hours, respectively, under the following environmental conditions A and B. The test result showing a change not larger than 40 μm under any of the conditions was considered to be acceptable and expressed as "O", while the test result showing a variation exceeding 40 μm was considered to be unacceptable and expressed as "X".

Condition A: Temperature 60° C., relative humidity 90%
Condition B: Temperature 80° C., relative humidity 90% b-2. Test for Durability

In the test of durability, the worm wheels of the above examples 11 to 13 and the comparative examples 11 and 12 were installed on an actual electric power steering device, respectively, and steering operations were repeated under the following environmental conditions C, D, E, and F to test durability. The test result was considered to be acceptable and expressed as "O" when a gear could tolerate 100,000 times of steering operations under any of the conditions, while the test result was considered to be unacceptable and expressed as "X" when a gear could not tolerate 100,000 times of steering operations.

Condition C: Temperature 30° C., relative humidity 50%
Condition D: Temperature 50° C., relative humidity 90%
Condition E: Temperature 80° C., relative humidity 50%
Condition F: Temperature 80° C., relative humidity 90%

As is apparent from the test results of the dimensional stability and the durability shown in FIG. 11, it was confirmed that dimensional change due to water absorption by the resin was suppressed by using glass fiber having a diameter of 6 to 7 μm as the glass fiber (GF) added to the resin. In conjunction with that, durability was found to be excellent under harsh environments of high temperature and high humidity.

b-3. Test for Wear Resistance

The test for wear resistance was carried out by forming plate test pieces with the use of the same resin materials as the resin materials of the worm wheels used in the examples 11 and 12 and the comparative examples 11 and 12, and subjecting to the ball-on-disk test using these test pieces and SUJ-made balls (three balls were arranged equally 120 degrees apart, the test piece was rotated, the peripheral speed at the contact portion of the ball top was 1 m/sec).

At a pressure on the contact surface Pmax set in the range of from 150 to 200 megapascals (MPa) and an atmospheric temperature set to 80° C. and in a state that grease (base oil: poly-α-olefin oil, thickener: aliphatic urea) was present between the test piece and the ball, rotation was continued for 8 hours, and then signs of wear of the test piece were observed.

As is apparent from the wear test results shown in FIG. 12, it was found that wear did not occur and wear resistance was excellent by the use of glass fiber having a diameter of 6 to 7 μm as the glass fiber (GF) mixed with the resin even when used under the conditions of high contact surface pressure.

Although glass fibers having diameters of 6 to 7 were used as the glass fiber (GF) in the examples 11 to 13 explained above, it was confirmed that approximately the same results were obtained even when glass fiber having a diameter of 5 to 9 μm was used, showing excellent dimensional stability, durability, and wear resistance. Therefore, in the present invention, glass fiber having a diameter of 5 to 9 μm is most suitable in size as the glass fiber (GF) mixed with the resin forming the resin gear.

The resin gear used in speed reduction gear mechanism for electric power steering device explained in the embodiments described above can be applied not only to the speed reduction gear mechanism for electric power steering device but needless to say to gear mechanism in general regardless of its use.

INDUSTRIAL APPLICABILITY

The electric power steering device and the resin gear used therein of the present invention can be an electric power steering device having high reliability and excellent durability in which generation of uncomfortable sounds such as rattling sound and vibration sound is suppressed when used for an electric power steering device for vehicle. Further, the resin gear can also be applied to gear mechanism in general in addition to the electric power steering device.

The invention claimed is:

1. An electric power steering device to transmit an auxiliary power by an electric motor to a steering mechanism of a vehicle via a speed reduction gear mechanism, the speed reduction gear mechanism comprising:
   a driven gear, that is a resin gear, having a resin part with gear teeth formed on an outer peripheral surface thereof and integrally formed on the outside of a metal core;
   a drive gear that meshes with the driven gear; and
   grease present at least between the driven gear and the drive gear,
   wherein the resin part of the resin gear is composed of a resin composition having a polyamide resin, as a base resin, containing 10 to 50% by weight of glass fiber having a diameter in the range of from 5 to 9 μm, and the grease is composed of a base oil formed mainly of at least one oil selected from mineral oil, poly α-olefin oil, and alkyl polyphenyl ether, a thickener, and 3 to 10% by weight of a wax having a melting point or softening point in the range of from 70 to 130° C.

2. The electric power steering device according to claim 1, wherein an adhesive layer composed of a silane coupling agent having either one of epoxy group or amino group on one end thereof is provided between the metal core and the resin part of the resin gear.

3. The electric power steering device according to claim 1, wherein the diameter of the glass fiber contained in the resin part of the resin gear is in the range of from 6 to 8 μm.

4. The electric power steering device according to claim 1, wherein the length of the glass fiber contained in the resin part of the resin gear is in the range of from 100 to 900 μm.

5. The electric power steering device according to claim 1, wherein the resin part of the resin gear is composed of a resin composition having the polyamide resin, as the base resin, with the glass fiber partially substituted by carbon fiber.

6. The electric power steering device according to claim 1, wherein the driven gear and the drive gear are in a form of worm wheel, helical gear, spur gear, bevel gear, or hypoid gear.

7. A resin gear suitable for power transmission, the resin gear having a resin part with gear teeth formed on an outer peripheral surface thereof and integrally formed on the outside of a metal core, the resin part being composed of a resin composition having a polyamide resin, as a base resin, containing 10 to 50% by weight of glass fiber having a diameter in the range of from 5 to 9 μm.

8. The resin gear according to claim 7, wherein an adhesive layer composed of a silane coupling agent having either one of epoxy group or amino group on one end thereof is provided between the metal core and the resin part.

9. The resin gear according to claim 7, wherein the diameter of the glass fiber contained in the resin part is in the range of from 6 to 8 μm.

10. The resin gear according to claim 7, wherein the length of the glass fiber contained in the resin part is in the range of from 100 to 900 μm.

11. The resin gear according to claim 7, wherein the resin part is composed of a resin composition having the polyamide resin, as the base resin, with the glass fiber partially substituted by carbon fiber.

12. The resin gear according to claim 7, wherein the resin gear is a worm wheel, a helical gear, a spur gear, a bevel gear, or a hypoid gear.

* * * * *